United States Patent [19]
Byrns et al.

[11] 3,936,103
[45] Feb. 3, 1976

[54] ROTARY SHAFT TILTING SHOE BEARING

[75] Inventors: Edson H. Byrns, Fayetteville; James W. Endress, Syracuse, both of N.Y.

[73] Assignee: Carrier Corporation, Syracuse, N.Y.

[22] Filed: Oct. 2, 1974

[21] Appl. No.: 511,146

[52] U.S. Cl. .................. 308/73; 308/9; 308/160
[51] Int. Cl.² ............... F16C 17/03; F16C 23/04; F16C 41/02; F16C 43/02
[58] Field of Search .................... 308/9, 73, 160

[56] References Cited
UNITED STATES PATENTS

| | | |
|---|---|---|
| 1,086,308 | 2/1914 | Parsons.................................. 308/73 |
| 3,022,123 | 2/1962 | Gruber.................................... 308/73 |
| 3,297,371 | 1/1967 | Salzman.................................. 308/73 |
| 3,708,216 | 1/1973 | Gerling................................... 308/73 |

Primary Examiner—Robert G. Sheridan
Assistant Examiner—Howard Beltran
Attorney, Agent, or Firm—J. Raymond Curtin; Thomas J. Wall

[57] ABSTRACT

A tilt shoe bearing assembly wherein each shoe in the assembly is provided with complete freedom to automatically adjust its position under various running conditions to offset critical running speeds by maintaining a fluid wedge between the shoe and the shaft.

4 Claims, 4 Drawing Figures

ROTARY SHAFT TILTING SHOE BEARING

BACKGROUND OF THE INVENTION

This invention relates to a tilt shoe bearing and, in particular, to a bearing assembly which provides the individual shoes complete freedom to accommodate the shaft of a high-speed machine such as a turbine, compressor, or the like.

It is commonly known in the art that a tilt shoe bearing provides excellent hydrodynamic support to a rotor shaft when the shaft is turning at most shaft speeds. This type of bearing is most effective in reducing vibrations at speeds above the first critical shaft speed by stiffening the hydrodynamic fluid film maintained between the bearing and the shaft thus minimizing the effect of fluid film whirl. However, lightly loaded bearings operating below the first critical speed can experience fluid film instability which results in excessive vibrations. Similarly, tilt shoe bearings are known to experience other harmful effects, which are also associated with shaft speeds, leading to unwanted vibrations being set up in the system.

It has been long known that the effects of these harmful forces can be minimized or considerably reduced in a hydrodynamic or multiple shoe bearing assembly by allowing the individual shoes to adjust their relative positions in relation to the shaft when the shaft undergoes deflections or vibrations whereby an optimum fluid wedge is maintained between the shoes and the shaft. As exemplified in U.S. Pat. Nos. 3,022,123 and 3,297,371, it has been heretofore conventional in the art to pivotally mount each shoe in assembly to permit the shoe to roll in the direction of shaft rotation. Further means are also provided to enable the individual shoes to pitch in an axial direction while the shoe rolls in the direction of shaft rotation. Although these devices, which provide the individual shoes with two degrees of freedom, considerably reduce the adverse effects of load induced forces, it has nevertheless been found that a greater degree of freedom must be provided to the shoes to more efficiently dampen out the effects of shaft deflections and vibrations.

SUMMARY OF THE INVENTION

It is therefore an object of the present invention to improve tilt shoe bearings.

A further object of the present invention is to improve the dampening qualities of a tilt shoe bearing.

A still further object of the present invention is to provide the individual shoes in a tilt shoe bearing assembly with sufficient freedom of movement so that each shoe can automatically adjust its relative position both in regard to the shaft and in regard to the other shoes so as to accommodate the shaft as it undergoes vibrations or deflections.

These and other objects of the present invention are attained by means of a tilt shoe bearing assembly having an annular cylindrical housing, a backing ring mounted within the housing and arranged to encompass a rotary shaft, the ring further containing a radially extended rib and an axially extended seat for receiving a plurality of tilt shoes thereon, each shoe having a contact surface for acting against the ring seat and a slotted opening therein for loosely receiving the rib section of said ring, the clearance maintained between the rib and the slotted opening being greater than the minimum design allowance between the shaft and shoe whereby each shoe is free to adjust its relative position upon the seat under load conditions in response to shaft vibrations and deflections.

DESCRIPTION OF THE PREFERRED EMBODIMENT

As conventionally known in the art, a hydrodynamic or multiple shoe bearing relies upon the formation of a hydrodynamic fluid film between the individual shoes and the rotating shaft to support and center the shaft as it is turning. Ideally, each shoe should have the ability to automatically shift its relative position in response to the shaft deflections or induced vibrations so as to maintain an optimum fluid wedge between the shoes and the shaft. As pointed out above, it has been conventional to provide each shoe with two degrees of freedom, typically by pivoting the shoe to allow it to roll in the direction of shaft rotation while at the same time providing further means to permit the shoe to pitch axially with the shaft. However, it has been found that in order to maintain a truly optimum fluid wedge during periods when a shaft is exposed to vibrations or load induced deflections, the shoe must be granted an even greater degree of freedom. The apparatus of the present invention provides this type of freedom and thus considerably minimizes the effects of unavoidable, but potentially harmful, forces encountered at critical running speeds.

Figure 1:
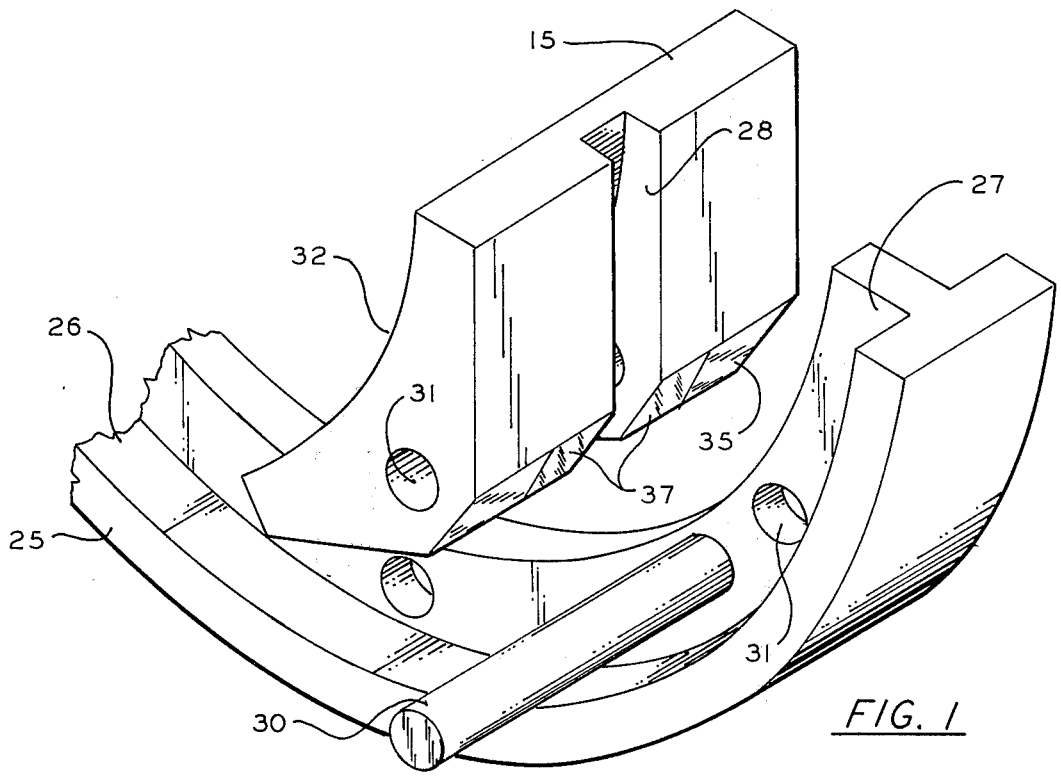
FIG. 1 is a partial exploded view in perspective showing one tilt shoe of the assembly and the backing ring embodying the teachings of the present invention.
Figure 2:
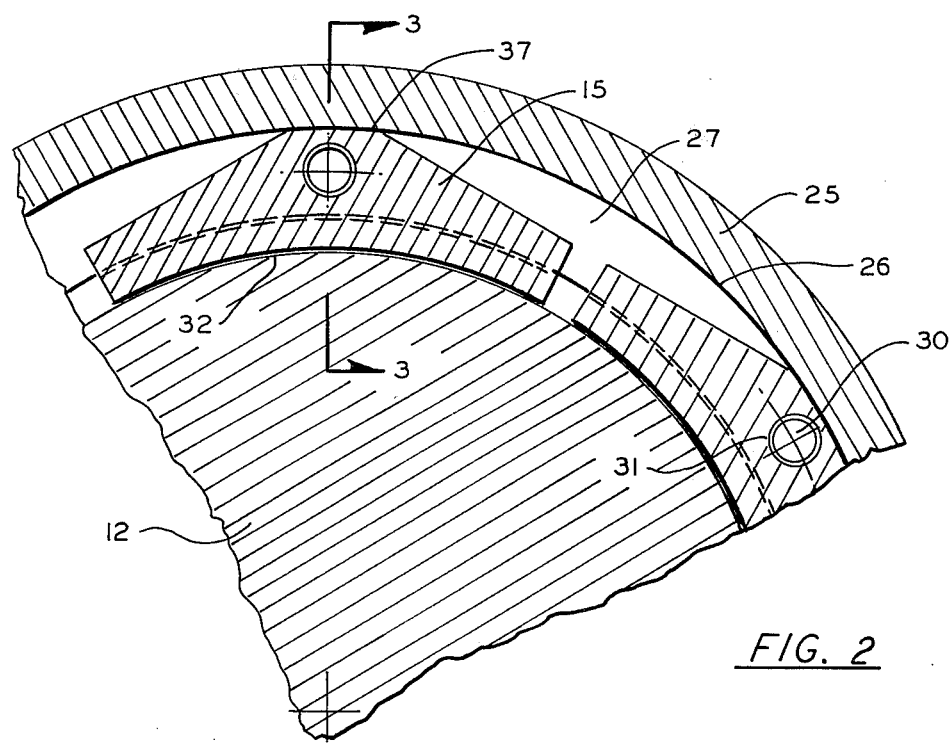
FIG. 2 is a partial end view of a tilt shoe operatively positioned in regard to a shaft.
Figure 3:
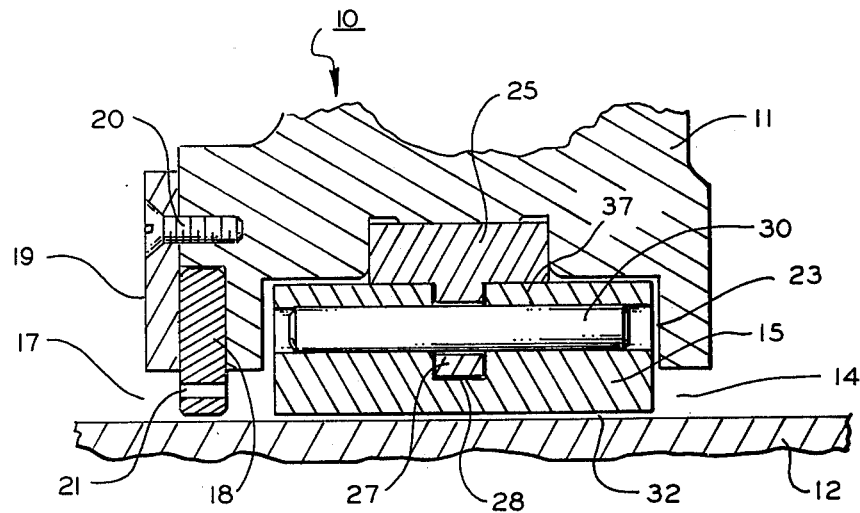
FIG. 3 is a section taken along line 3—3 as illustrated in FIG. 2.

Referring now more specifically to FIGS. 1–3, there is illustrated generally a hydrodynamic bearing assembly 10 including a cylindrical housing 11 encompassing shaft 12 of a rotary machine such as a turbine or a compressor. As is well known in the art, a lubricant such as oil is delivered under pressure into the assembly through an inlet passage 14 and then passed between the shaft 12 and the individual shoes 15. Under the influence of the rotating shaft, a hydrodynamic film is established between the shaft and the shoes which serves to support and center the shaft within the assembly. The fluid moves across the housing and is ultimately discharged therefrom via outlet 17. As best seen in FIG. 3, a discharge control plate 18 is secured in the outlet passage by means of a cover 19 which is secured to the housing by cap screw 20. The plate has a series of orifices 21 formed therein which function to regulate the rate of flow of fluid across the housing.

Mounted within internal cavity 23, formed within the housing, is an annular backing ring 25. The ring is carried within a complementary circular groove machined or otherwise formed in the internal wall of the cavity. It should be noted that when the ring is positioned in the groove, the internal surface 26 of the ring protrudes radially some distance from the inner cavity wall. As will be explained in greater detail below, surface 26 provides a seat against which the individual shoes act when the fluid wedge or hydrodynamic film is established between the shaft and the shoes. A centrally located annular rib 27 extends inwardly in a radial direction from the ring seat towards the shaft 12.

As best seen in FIG. 2, a plurality of tilt shoes are mounted about the shaft within the housing. Although any number of shoes can be employed in the practice of the present invention, it is preferred that an even number of shoes be herein utilized in order to more evenly distribute the forces involved when adverse loading conditions are encountered. Each shoe has an arcuate-shaped slot 28 radially formed therein for loosely receiving the extended rib of the backing ring. A torque pin 30 is mounted within a hole 31 that passes coaxially through each shoe and the rib. It should be noted at this point that the pin is not employed as a pivot as conventionally found in most tilt shoe assemblies and that the pin merely functions to resist the torque generated in the shoe by the rotating shaft. In practice, the pin is loosely fitted within the hole to allow the shoe to float in respect to the rib.

Each shoe in the assembly has an extended bearing surface 32 arranged to confront the shaft and complement the outer periphery thereof. The body of the shoe is tapered toward a narrow elongated surface 35. Surface 35 is interrupted by the radially aligned slot 28 formed therein and contains two slightly raised contact pads 36 located on either side of the slotted opening. The pads are adapted to ride in contact against the ring seat 26 when a hydrodynamic wedge is generated between the shaft and the shoe. The contact pads have a crowned working surface which rides against the ring seat and permits the shoe to freely move upon the seat. It should be also noted that the axial length of the shoe measured along the surface 35 is substantially greater than the axial length of the ring support seat. Preferably, the axial length of the shoe should be equal to or greater than twice the axial length of the ring seat. By providing a greater axial length to the shoe, the ring seat acts as a fulcrum in regard to the crowned surface of the contact pads whereby the shoes readily respond to changes in the shaft position to maintain an optimum fluid wedge. In practice, the clearance between the shoe and the backing ring rib, as well as the clearance between the shoe and the torque pin, is greater than the allowance between the shoe bearing surface and the shaft. As a result, the shoe is provided sufficient freedom of movement upon the ring seat in any direction to accommodate the shaft during periods when the shaft is deflected or experiencing vibrations.

Figure 4:
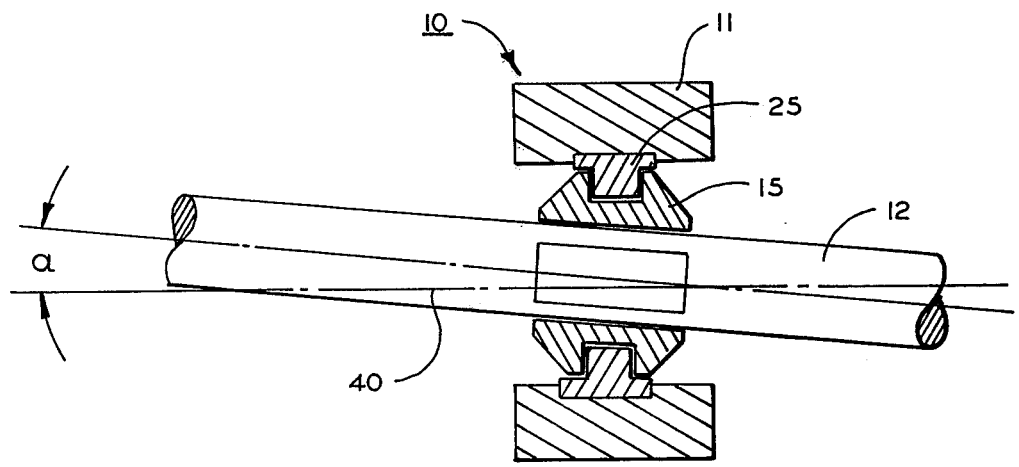
FIG. 4 is a schematic representation of the tilt shoe assembly of the present invention showing the positioning of the shoes under a critical operating load.

As should be evidenced from the discussion above, the individual bearing shoes of the present assembly are loosely mounted within the housing so that the individual shoes can freely move in any direction. As a consequence, each shoe will adjust its position in relation to the shaft so as to maintain an optimum fluid wedge therebetween for all operating conditions. FIG. 4 schematically illustrates, although in a slightly exaggerated form, this particular feature of the bearing assembly. As illustrated, the shaft is being deflected some distance (*a*) from the normal center line 40 of the machine. As can be seen, the bearing housing 10, which is secured in the main machine frame, retains its original position in relation to the center line 40 during this critical period. The bearing shoes 15 of the present invention, however, respond to this adverse running condition by automatically adjusting their relative positions in regard to the shaft to maintain an optimum hydrodynamic wedge therebetween. In order to accomplish this result, the top shoe in the assembly, as illustrated, must move rearwardly while at the same time pivoting upwardly to accommodate the shaft and thus preserve the integrity of the system. Similarly, the lower shoe must also adjust its position in the opposite direction. At the same time, the centrally located shoe shifts obliquely from its original position to the position shown.

While this invention has been described with reference to the structure herein disclosed, it is not necessarily confined to the details as set forth and this application is intended to cover any modifications or changes as may come within the scope of the following claims.

What is claim is:

1. A tilt shoe bearing assembly for establishing a hydrodynamic wedge between the shoes and a shaft, for rotatably supporting the shaft, including
   a housing having an annular opening through which the shaft passes,
   a stationary backing ring mounted within the housing opening encompassing the shaft, the inner surface of said ring forming a circular seat uniformly disposed about the shaft and having a centrally located annular rib radially extended toward the shaft,
   a plurality of tilt shoe members circumferentially spaced within the ring, each shoe having a circumferential slot formed in the body thereof for loosely receiving said rib,
   a pair of rocker pads formed upon the outer periphery of each shoe member positioned on either side of said slot and being arranged to ride in contact with the ring seat, the axial width of each pad being substantially less than the axial width of the shoe surface confronting the shaft with each pad being contoured to permit the shoe to move upon the seat in any direction,
   a torque pin axially aligned with the shaft supported within the body of each tilt shoe and being arranged to pass through an opening formed in the annular rib whereby the shoe is prevented from moving with the shaft in the direction of shaft rotation, and
   the rib and the circumferential slot formed in the shoe, and the pin and the opening formed in the rib, having a clearance therebewteen that is at least greater than the width of the hydrodynamic wedge whereby each shoe is free to adjust its relative position in regard to the shaft to accommodate the shaft as it deflects under load.

2. The assembly of claim 1 wherein the body of the shoe is tapered circumferentially from a greater dimension at the shaft's confronting surface to a lesser dimension at the contoured rocker pads.

3. The assembly of claim 2 wherein the axial length of the shoe surface confronting the shaft is greater than twice the axial length of the ring seat.

4. The assembly of claim 3 wherein the rocker pads formed upon each shoe have a crowned surface.

* * * * *